Figure 1:
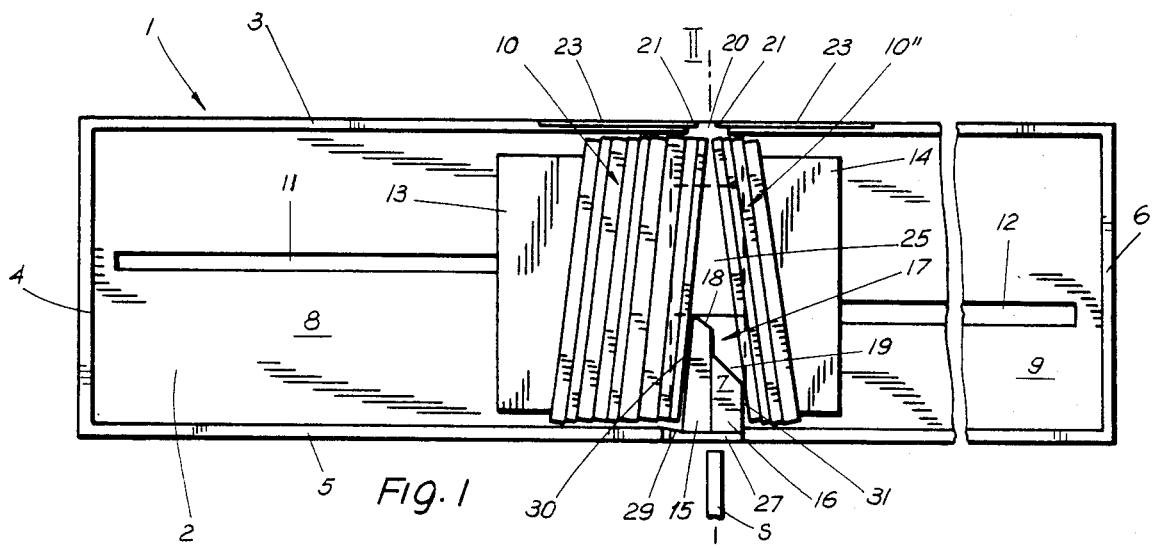

United States Patent [19]

Pobenberger

[11] Patent Number: 4,671,633
[45] Date of Patent: Jun. 9, 1987

[54] SLIDE MAGAZINE FOR A SLIDE PROJECTOR HAVING A PICTURE CHANGING DEVICE WITH A HORIZONTALLY ACTIVATED SLIDE PUSHER

[75] Inventor: Ernst Pobenberger, Weigelsdorf, Austria

[73] Assignee: Patent-Treuhand-Gesellschaft Fur Elektrische Gluhlampen m.b.H., Munich, Fed. Rep. of Germany

[21] Appl. No.: 782,704

[22] Filed: Oct. 1, 1985

[30] Foreign Application Priority Data

Oct. 9, 1984 [AT] Austria ................... 3211/84

[51] Int. Cl.$^4$ ............................................. G03B 23/04
[52] U.S. Cl. ..................................... 353/104; 353/116; 353/DIG. 1
[58] Field of Search ............... 353/104, 114, 116, 118, 353/DIG. 1

[56] References Cited

U.S. PATENT DOCUMENTS 2,583,442 1/1952 Parlini ................... 353/104

FOREIGN PATENT DOCUMENTS 1374946 8/1964 France ................... 353/DIG. 1
1464989 11/1966 France ................... 353/DIG. 1

Primary Examiner—Harry N. Haroian
Attorney, Agent, or Firm—Ladas & Parry

[57] ABSTRACT

The invention relates to a slide magazine with housing, open at the top, for a slide projector with a picture-changing device having a horizontally actuated slide pusher. The housing, which can be mounted immovably in the projector, has, approximately in the longitudinal center of a longitudinal wall, an opening for a slide, opposite which there is a deflector with a deflecting surface, which runs at an angle to the longitudinal center plane of the housing. In the area of the deflector, a transporting lever, which can be moved transversely to the longitudinal center plane from a resting position to a working position, and which has a working surface that works together with the slide pusher, is mounted especially so that it can be swivelled. With the transporting lever in the resting position, the working surface protrudes into the path of the slide pusher. However, when the transporting lever is in the working position, the working surface is arranged outside of this path. The transporting lever has a slide-driving surface, which is arranged at that side of the transporting lever, which is associated with the end of the deflecting surface nearer to the opening. In the working position of the transporting lever, the driving surface is shifted by a predetermined amount in the direction of the opening. On each side of the deflector, a counterpressure device, is provided for the slides. The transport of the slides is accomplished partly by means of the transporting lever and partly by means of the slide pusher from one side of the deflector to the other side of the deflector. The slides are inserted in the housing as a stack and may have different thicknesses.

30 Claims, 11 Drawing Figures

SLIDE MAGAZINE FOR A SLIDE PROJECTOR HAVING A PICTURE CHANGING DEVICE WITH A HORIZONTALLY ACTIVATED SLIDE PUSHER

The invention relates to a slide magazine with an essentially box-shaped housing, open at the top, for a slide projector with a picture-changing device having a horizontally actuated slide pusher.

Conventional slide magazines have a frame with a number of compartments arranged in a row for, in each case, one slide, the frame being provided with sliding surfaces as well as a gear tooth system for transport through the projector.

On the other hand, slides are usually kept in boxes or cassettes, so that, before the slide presentation, the slides have to be taken from the box and inserted in the magazine in the correct sequence and, after the presentation, the slides have to be removed from the magazine and returned once again to the box. This procedure is laborious and timeconsuming and, for projecting a larger number of slides, requires several magazines or an interruption in the presentation. Placing the slides in the compartments is not always easy, for which reason some loading devices have also already been proposed.

It is furthermore disadvantageous that there are several types of slide frames and of slide magazines and that not every frame fits into the compartment of every magazine, because the frames have different thicknesses (1.0 to 3.2 mm).

Likewise, because of the compartments and the gear tooth system, the manufacture of the magazines is expensive. In order to keep the overall length of the magazines short, the walls of the compartments must be very thin, so that they can easily break.

Admittedly, from U.S. Pat. No. 2,525,564, a picture-changing device for a slide projector is known, with which the problem of showing slides of different thicknesses is said to be solved. For this purpose, a spring plate, arranged in the equipment, is provided and, on either side of the slide pusher, a magazine with a spring-loaded counterpressure device for the slides is mounted on the equipment. Because the spring plate is arranged outside of the magazine, the equipment is susceptible to breakdowns; moreover, the slides must be inserted into or removed from a magazine, which is attached to the equipment, and this is troublesome and awkward.

It is an object of the invention to eliminate the disadvantages listed and to provide a slide magazine, into which the slides, taken from a box or the like, can be inserted as a stack or lying next to each other and nevertheless projected individually, the different thicknesses of the individual slides not playing a role. At the end of the presentation moreover, it should be possible to remove the slides once again as stack.

In addition, the slide magazine shall be suitable for the majority of projectors, commercially available at the present time, and shall not be restricted to a particular type of instrument or require a special construction of the projector.

This objective is accomplished with a slide magazine of the type given above, owing to the fact that an opening, matching the thickness of the slide is inventively formed in longitudinal wall of the housing at about the longitudinal center, that a deflector, with a deflecting surface that runs essentially at an angle to the longitudinal center plane of the housing, lies opposite this opening, that in the area of the deflector a transporting lever, which can be moved transversely to the longitudinal center plane from a resting position to a working position, is provided with a working surface, which works together with the slide pusher of the picture-changing device of the projector and which, when the slide magazine is inserted into the projector and the transporting lever is in the resting position, protrudes into the path of the slide pusher or, when the transporting lever is in the working position, is arranged outside of this path, the transporting lever having a slide-driving surface, which projects above the deflector, is arranged at that side of the transporting lever assigned to the end of the deflecting surface nearer to the opening and which, when the transporting lever is in the working position, is shifted by a predetermined amount in the direction of the opening, and that a counterpressure device, which is known as such, is provided for the slides on each side of the deflector.

In this manner, the invention provides a slide magazine, which is free of compartments and gear tooth systems and is stationary in the projector, while the latter is being operated. The magazine can therefore readily be constructed for use in any projector with a pusher-operated picture-changing device, because the particular transporting device of the equipment does not have to be taken into consideration.

The handling and the projecting of the slides is simplified significantly, because the slides can be taken as a stack from a storage cassette and inserted in and also removed again from the magazine and the timeconsuming insertion in the compartments is no longer necessary. In addition, slides of different thicknesses can be projected in any sequence.

Admittedly, this type of projection has already been attempted. However, the equipment developed for this purpose, which did not have a magazine and with which slanting slides were introduced from a stack into a slide channel and transferred from this by means of a controlled partition to a second stack of slanting slides, was not successful in practice (Swiss Pat. No. 608,896).

A similar slide projector is known from the Swiss Pat. No. 550,421, in which there is a swivelling driver at the front side of the slide pusher. A twistable guiding mechanism is provided for transferring a slide from one magazine into the other. This construction also has not proven to be satisfactory.

In a further advantageous development of the invention, the deflector can be bounded at its sides by inclined surfaces converging towards the opening. These inclined surface form locating faces for the slides, in order to hold them in position pointing to the opening or in a position parallel to this.

It is furthermore advantageous if the deflector is divided into two parts, each of which has one part of the deflecting surface.

Moreover, the parts of the deflecting surface may be mutually offset transversely to the longitudinal center plane. For manufacturing the magazine from a plastic, it is advantageous if the deflector is divided along a plane through the center of the opening as well as perpendicular to the longitudinal center plane into two ribs, which are arranged one on top of the other and each of which has a part of the deflecting surface.

For projecting slides of different thicknesses, it is preferable if two restraining organs, which are mutually pretensioned and movable at least parallel to the longitudinal center plane, are arranged in the opening. In this connection, each restraining organ is simply formed by a U-shaped end of spring wire, which is mounted at a distance from the opening. In particular, each spring wire is L-shaped, the one leg, running essentially perpendicular to the base of the housing, carrying the restraining organ and being mounted at a distance from this organ and in a manner so as to be freely rotatable, and the other leg being arranged above the restraining organ and a pointing away from the opening. In this manner, the restraining organs can give way not only parallel to the longitudinal center plane, but also towards the outside or inside of the housing, when a slide is pushed through the opening, whereby, on the one hand, the remaining slides of different thickness are reliably held back and, on the other, the slides are prevented from sticking in the opening.

For manufacturing reasons, it is advantageous if each spring wire is mounted on a sheet bar, which is connected with the housing.

Although different forms of construction of the transporting lever are possible, it is preferred if the transporting lever is L-shaped and mounted in the housing so as to be movable to a predetermined extent, because, in so doing, the direction of shifting the transporting lever essentially coincides with the direction of transporting the slide.

In addition or alternatively hereto, the transporting lever may swivel about an axis parallel to the longitudinal axis of the magazine.

It is also advantageous if the transporting lever is pretensioned in its resting position by a spring.

The manufacturing process is simplified while reliable functioning is assured if the one leg of the transporting lever is guided in the base of the housing and the other leg of the transporting lever has recesses matching the two ribs.

For reliably taking hold of the foremost slide, the driving surface of the transporting lever can be essentially perpendicular to the adjacent inclined surface of the deflector.

To assure the return of the slide from the projector into the magazine, provisions can be made so that the opening to the outside of the housing is enlarged.

Moreover, each counterpressure device may have a block, which is pretensioned relatively to the deflector and supported so as to be movable in the longitudinal direction of the housing, and the surface of which, pointing to the deflector, runs parallel to the associated inclined surface of the deflector, because, in this way, all the slides of a stack lie flat against each another.

A variant of the invention is characterized by the fact that the deflector is formed by a plate, which is supported in the housing preferably with limited ability to swivel, the transporting lever being provided on the plate. The transporting lever, as well as the deflector, can be configured and constructed more simply in this manner. To simplify the installation of the slide magazine, the plate may have plug-in pegs, on which it is supported so that it can swivel and which engage appropriate recesses in the housing with play.

For the trouble-free changing of slides, the plate may be tapered towards the opening. Moreover, the part of the deflecting surface, lying closer to the opening, may be formed on a tab, especially a tab which is integrally molded in one part with the plate and which is spring-mounted on the plate. For the same purpose, a guiding mechanism for the pusher is provided on the plate. Moreover, the end of the guiding mechanism, facing away from the opening, may be enlarged. In this connection, it is furthermore advantageous if the transporting lever, which is mounted so that it can swivel on the plate, is guided at its free end in a guiding slot of the plate. In addition, the transporting lever may be wedge-shaped in the region of the driving surface.

In order to preserve the guide frames, the side of the plate corresponding to the input side of the slides may have a stop for the respective foremost slide, to which an inclined surface adjoins.

Moreover, the driving surface may be curved convexly in the direction towards the opening.

It is also advantageous if the opening is enlarged towards the inside of the housing.

For the correct return of the first slide to be projected, the counterpressure device, associated with the discharge side of the deflector, may be provided with an inclined guiding rib or the like.

To reduce friction, the counterpressure devices may rest on the base of the housing on two sliding skids.

Finally, it is of advantage if the housing is provided with at least one stop, especially an adjustable stop, which is known as such and used to set the relative position of the opening with respect to the slide channel of the projector.

The invention is explained in greater detail below by means of preferred examples of the operation, which are shown schematically in the drawings.

Figure 2:
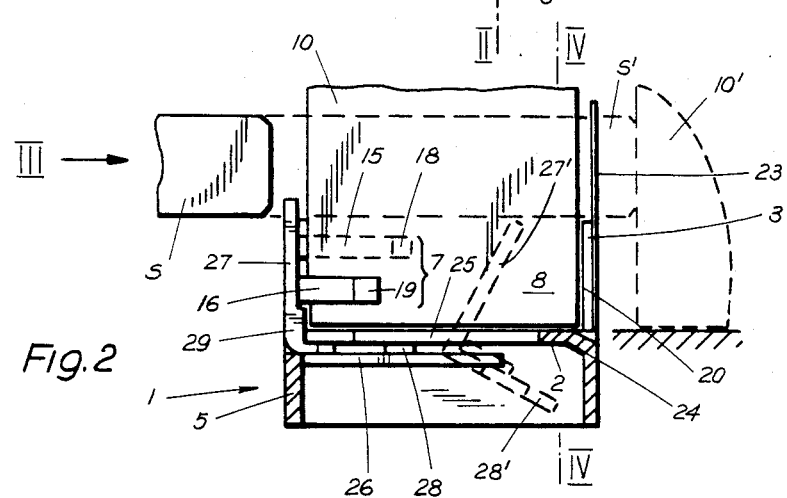
Figure 3:
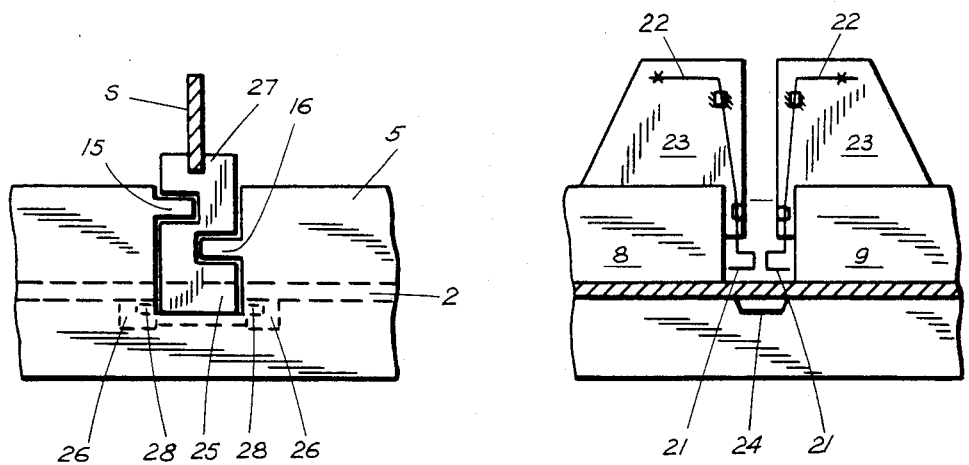
Figure 4:
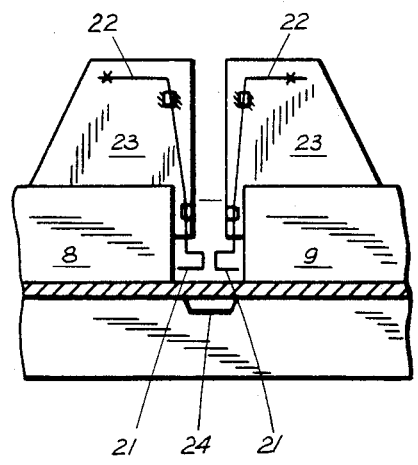
Figure 5:
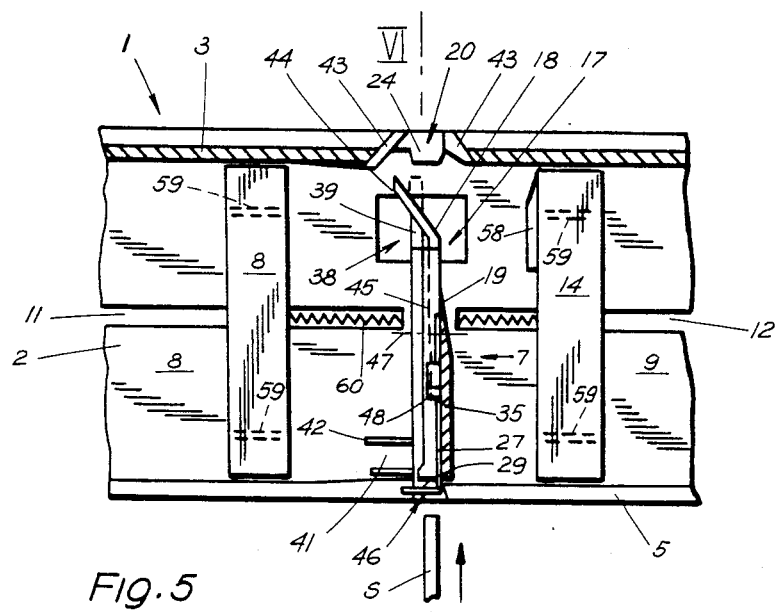
Figure 6A:
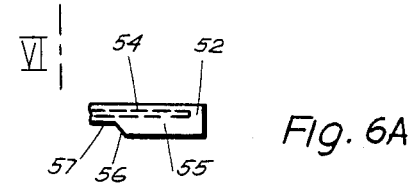
Figure 6:
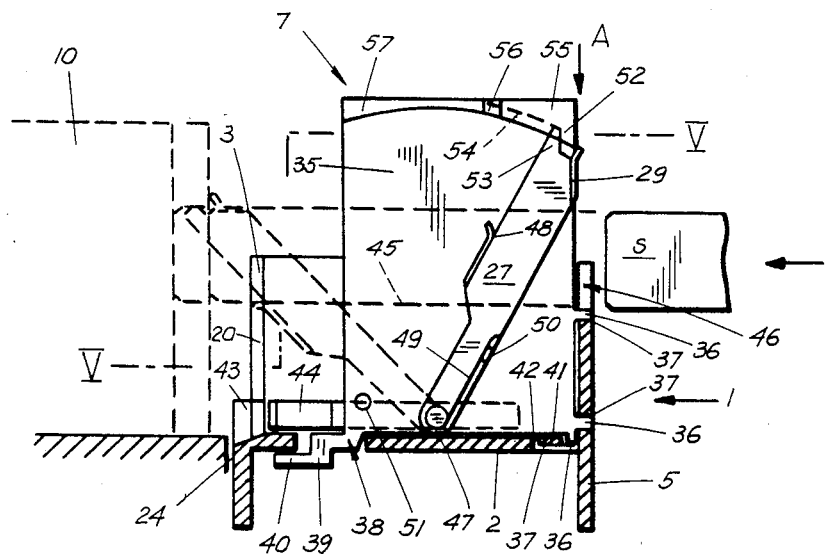
Figure 7:
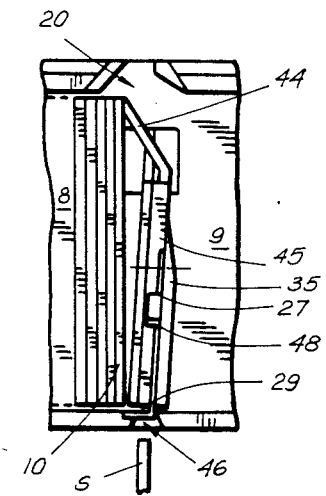
Figure 8:
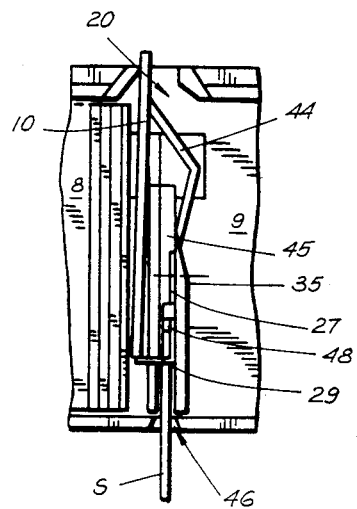
Figure 9:
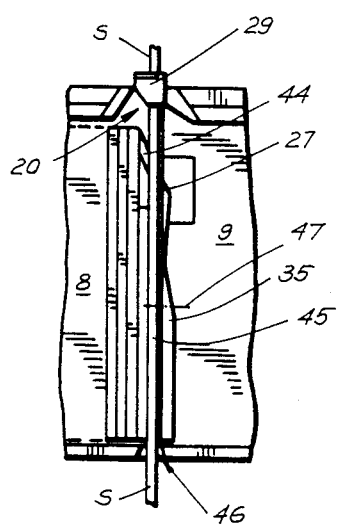
Figure 10:
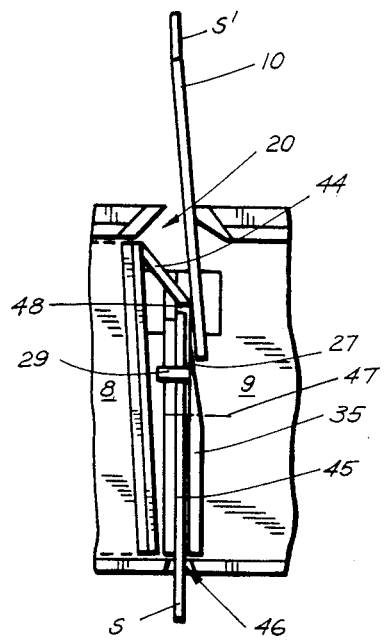

FIG. 1 shows a first example of the operation of the slide magazine in plan view, FIG. 2 a cross section through the magazine along the line II—II in FIG. 1, FIG. 3 a view in the direction of the arrow III in FIG. 2, FIG. 4 a section along the line IV—IV in FIG. 2, FIG. 5 a second example of the operation of the slide magazine in partial plant view and in section along the line V—V in FIG. 6, FIG. 6 a cross section through the magazine along the line VI—VI in FIG. 5, FIG. 6A a plan view of a detail of the deflector, in the direction of arrow A in FIG. 6, FIG. 7 a simplified plan view of the magazine with inserted slides, the slide pusher being pulled out, FIG. 8 a simplified plan view of the magazine during the initial phase of pushing a slide into the (not shown) slide channel, FIG. 9 a simplified plan view of the magazine with the slide pushed further into the (not show) slide channel and FIG. 10 a simplified plan view of the magazine during the return of the slide into the magazine.

The invention slide magazine has a box-shaped housing 1 with a rectangular base 2 and four sidewalls 3, 4, 5, 6 of equal height. With respect to its cross-sectional dimensions and shape, the housing 1 is constructed to correspond to the frame size and the magazine tunnel, the magazine guiding mechanisms and the magazine transporting device of the usual slide projectors and viewers, so that it can be used in most projectors.

The housing 1 is equipped with (not shown) adjustable stops, which work together with the components of the projector, in order to achieve and maintain the relative position, necessary for the equipment to function. During the projection, the magazine is arranged immovably in the projector; it therefore has neither a sliding surface nor a gear tooth system for engaging a transporting device.

The housing 1 has an essentially continuous, flat base 2, and is divided at about its longitudinal center by a deflector 7 into two compartments 8 and 9, of which compartment 8, at the left in FIG. 1, serves to hold the slides 10 that are to be projected.

In the base 2 in each compartment 8, 9, a longitudinal slot 11 or 12 is formed, through which a foot grips, which is provided at the underside of a block 13 or 14 and which is engaged by a tension spring, with which the blocks 13, 14 are placed under tension to the longitudinal center of the housing 1. In this manner, a counter pressure device is provided, which engages the slides 10 and holds these as a stack.

The deflector 7 is formed by two ribs 15, 16, which are arranged at a distance one above the other and which protrude from a longitudinal sidewall 5 into the housing 1 and, with their free ends, form a deflecting surface 17; in the example of the operation shown, the deflecting surface consists of two parts 18, 19, which are mutually offset transversely to the longitudinal direction of the housing.

In the region of the deflector 7, this deflector, as well as the adjacent side wall 5, is lower than the bottom edge of the slide pusher S of the projector (FIG. 2).

In the sidewall 3 opposite to the deflector 7, a slot-shaped opening 20 is formed, the plane through the center of the opening 20 and perpendicular to the longitudinal center plane of the housing 1 intersecting the deflecting surface 17. The deflector surface 17 is essentially perpendicular to the base 2 of the housing and lies in a plane, (which extends) from a place of the sidewall 3, associated with the opening 20 and in the input (left) side of compartment 8, to a place of the opposite sidewall 5 in the compartment 9 on the discharge (right) side.

In the opening 20 (FIG. 4), spring-mounted restraining organs 21 are arranged, which are formed U-shaped ends of an L-shaped spring wire 22 and the function of which is, to allow one of the slides to pass through the opening, when slides of different thicknesses are being projected, but to reliably restrain the respective followig slide in compartment 8.

The spring wires 22 have two legs, one of which runs essentially perpendicular to the base 2 of the housing and carries the restraining organ 21, the other being arranged at the upper side parallel to the sidewall 3. Each spring wire 22 is mounted on a sheet bar 23, which is connected with the sidewall 3, the upper leg being attached at its free end to the plate bar 23 and the other leg being held rotatably in the upper region as well as furthermore being mounted in the region of the restraining organ 21 so as to be rotatable as well as displaceable parallel to the sidewall 3, its movement to the opposite spring wire 22 optionally being limited by a stop. The distance between the restraining organs 21 is at least equal to the thickness of the thinnest conventional slide or its frame, whereas the distance between the adjoining legs of the spring wires 22 is greater than the thickness of the thickest conventional slide or frame. Accordingly, the thinnest slides can pass between the restraining organs 21; all the remaining slides, however, engage one or both restraining organs 21 and cause these to be deflected elastically, the restraining organs 21 initially being tilted about the axis of the adjoining spring wire leg and this leg subsequently being bent elastically away from the outlet 20.

In the region of the outlet 20, the housing is provided with a funnel-shaped enlargement 24, which enlarges towards the outside.

In the base 2 of the housing, a recess 25, running from the deflector 7 to the opening 20, is provided with guiding mechanisms 26, in which the transporting lever 27 is movably mounted. The transporting lever 27 is L-shaped (FIG. 2), its leg, parallel to the base 2 of the housing, carrying at its free end two laterally projecting extensions 28, which engage the guiding mechanisms 26. The other, upright leg is provided with two ribs 15, 16 corresponding to the recesses and rises above the adjacent sidewall 5 by a specified amount. The transporting lever 27 is held by a (not shown) spring in its resting position, which is shown by solid lines in FIG. 2, and is mounted in the base 2 of the housing in such a manner, that it can be pushed by a specified amount towards the opening 20, in which position the extensions 28 leave the guiding mechanisms 26 and the transporting lever 27 can be tilted about the junction point of the two legs. The tilted transporting lever 27 is shown in this working position by broken lines in FIG. 2.

The height of the upright leg of transporting lever 27 is such that, with the magazine arranged in the projector, the leg, when in the resting position, protrudes into the path of the slide pusher S, but when in the working position, lies outside of or below the path of the slide pusher S, as is also indicated by broken lines. At the same time, the spring holds the leg against the underside of the pushed-in slide pusher S'.

At the side of the deflector 7, pointing to the compartment 8 on the input side, a driving surface 29, provided at the transporting lever 27, protrudes into this compartment 8, but is approximately flush with the adjacent sidewall 5 (FIG. 1).

Since the deflector 7 requires a certain amount of space, which is larger than the width of the opening 20, the slides 10 in compartment 8 and 9 are inclined at an angle to the longitudinal direction of the housing. For this reason, the sides of the deflector 7 and the ribs 15, 16, pointing to the compartments 8, 9, are bounded by an inclined surface 30 or 31, the inclined surfaces 30, 31 converging towards the outlet 20. Furthermore, the counterpressure surfaces of blocks 13, 14, pointing to the deflector 7, are constructed parallel to these inclined surfaces 30, 31.

Slides are projected with the help of the inventive slide magazine in the manner described below.

A stack of slide 10, which are to be projected and which can have random thicknesses, is inserted in the left (input side) compartment 8, after the block 13 has been pushed against the force of the counterpressure spring in the slot 11 (at the left of FIG. 1). After the clock 13 is released, it is pressed by the counterpressure spring against the stack and consequently the slides 10, standing side by side, are pressed against the rib 15 of the deflector 7. Hereupon, the slide pusher S of the projector is pulled out and the slide magazine is inserted in the projector in such a manner, that the opening 20 of the magazine lies opposite the slide channel of the projector. This is facilitated and assured by the stops, which have been mentioned, but which are not shown in the drawing.

If now the slide pusher S is operated or pushed in, it strikes against the upper edge of the transporting lever 27 (FIG. 2) and pushes this against the force of the restoring spring into the housing 1, the transporting lever 27 being guided, on the one hand, in the housing base 2 and, on the other, by the ribs 15, 16 of the deflector 7. During this pushing-in movement, the transporting lever 27, with its driving surface 29, lays hold of the foremost slide 10, that is, the slide adjacent to the deflector 7, and pushes it to the opening 20. If the slide 10 is provided with the thinnest, conventional commercial frames (1 mm thick), it passes readily through the opening 20, adjacent slides 10, possibly being carried along by friction, being stopped at the opening by the restraining organ 21 (shown at the left in the drawings). If, however, the frame of the slide 10 is thicker, it strikes against one or both restraining organs 21 (FIG. 3), which thereby are tilted outwards, thus putting the adjoining leg of the spring wires 22 under tension; as soon as the slide 10 has passed between the restraining organs 21, the tension on the legs of the spring wires 22 is relaxed and the restraining organs 21 glide back on the slide 10 to their starting position, the spring wire 22 being bent apart.

As the slide pusher S continues to be pushed in, the slide 10 reaches the slide channel of the projector, as a result of which it is swivelled into the plane of the slide channel, so that it now stands practically perpendicularly to the longitudinal middle plane of the housing 1. During this swivelling motion, the rear end of the slide 10 glides from the driving surface of the 29 into the center of the transporting lever 27 and thus stands aligned with the slide pusher S.

As the slide pusher S is pushed in further, the extensions 28 of the transporting lever 27 emerge from the guiding mechanisms 26, and the transporting lever 27 is stopped from being pushed in further by a (not shown) stop; the transporting lever 27 therefore swivels about the junction of its legs, until the upper edge of the transporting lever 27 lies below the level of the lower edge of the slide pusher S and the slide pusher S can glide away over the transporting lever 27', which has been swivelled out of the way.

Since the slide 10 has been brought into alignment with the slide pusher S, the latter now lays hold of the slide 10 and pushes it further into the slide channel (10' and S' in FIG. 2), whereas the transporting lever 27' remains in the out-of-the-way position, into which it has been swivelled.

After the slide 10' has been projected, the slide pusher S is pulled out. In so doing, a driving lug, which is known as such and is mounted on the inside of the slide pusher S, takes hold of the slide 10' and pushes it out of the slide channel. As soon as the slide pusher S has released the transporting lever 27', which had been swiveled out of the way, this lever swivels under the action of its restoring spring and, if necessary, with the help of the slide 10, which is being pushed back, into the upright position and, after the extensions 28 once again engage the guiding mechanisms 26, returns to its starting position.

The slide 10, however, is guided against the deflecting surface 17 and deflected at this in the direction of the second (right) compartment 9. At the end of the ejection motion of the slide pusher S, the slide 10 comes to lie against the block 14 in this compartment 9, which gives way against the force of its spring (to the right), so that the slide reaches its final position, which has been labeled 10''.

If the slide pusher S is pushed in once again, the processes are repeated with the next slide, until finally all slides 10 have been transferred from the one (left) compartment 8 into the other (right) compartment 9.

Then, with the slide pusher S pushed out, the magazine can be removed from the projector. The slides 10'' in the compartment 9 can be removed at once as a stack and placed in their storage cassette or the like.

Numerous modifications are possible within the scope of the invention. For example, the transporting lever may be tiltable about a physical axis, which may also lie above the upper edge of the slide pusher. Alternatively, the transporting lever could also be guided along a path, which is inclined to the base of the housing. Likewise, the restraining organs can also be constructed differently, for example of two oppositely pretensioned lamina, which are inserted in the sidewall and pushed apart by the respective slide.

A different embodiment of the invention is shown in FIGS. 5, 6 and 6A. With this embodiment also, the slide magazine has a box-shaped housing 1 with a rectangular base 2 and four sidewalls of equal height, of which only the longer sidewalls 3 and 5 are shown.

The housing 1 once again is divided into two compartments 8 and 9 by the deflector 7, arranged approximately in the longitudinal center, the slides being transferred from the compartment 8 (at the left in FIG. 5) after the projection into the compartment 9 (at the right in FIG. 5), as will be explained below.

In the base 2 of each compartment 8, 9, a longitudinal slot 11 or 12 is formed, each guiding a block 13 or 14 of the respective counterpressure device.

Deflector 7 is formed by a plate 35, which is arranged transversely to the longitudinal axis of the housing 1 in the region of an opening 20 and is supported so as to be tiltable to a limited extent. For this purpose, the plate 35 is provided with two plug-in pegs 36 at its side facing away from the opening 20 and with a further plug-in peg 36 at the associated lower corner. These plug-in pegs engage recesses 37 in the side wall 5 and in the base 2 with play. In the region of the opening 20, a window 38 is provided in the base 2 of the housing 1. A foot 39 of plate 35, which has an extension 40 undergrasping the base 2, engages the window 38. In the region of the plug-in peg 36, the base 2 is provided with an elastic tab 41. The housing advantageously consists of a plastic material and the tab 41 is formed by a U-shaped slot 42 in the base 2, its thickness being suitably chosen.

The plate 35 is inserted into the housing 1 simply by introducing the extension 40 and then the foot 39 into the window 38, pressing the plate 35 downwards, the tab 41 being deformed elastically by the lower plug-in peg 36, and pushing the lateral plug-in pegs 36 into the recesses 37 in the sidewall 5, whereupon the tab 41 springs back into its initial position and the plate 35 is installed. Because of the play of the plug-in pegs 36 in the recesses 37, the plate 35 can be tilted, the tilt being limited by the fact that the foot 39 strikes against the edges of the window 38.

The opening 20, opposite the deflector 7 or the plate 35, tapers towards the outside and, in the region of the base 2, has two, short inclined steps 43 for guiding the slide. In the region of the opening 20, the base 2 itself is provided with an enlargement 24, leading downwards, in order to facilitate the return of the slide.

Opposite the opening 20, the plate 35 is provided with an elastic tab 44, which is formed especially in one part with the plate 35, consisting of an appropriate plastic. A portion 18 of the deflecting surface 17 is formed on this tab 44; a second portion 19 of the deflecting surface 17 is provided on the plate 35 itself at about its center.

At a height level with the slide pusher S of the projector, a guide mechanism 45 for the slide pusher S is formed in the plate 35. This guide mechanism 45 consists simply of an open channel and is enlarged at the inlet side of the slide pusher S (in FIG. 6 towards the right). At this place, the adjacent sidewall 5 has a slot 46, since the housing 1 reaches up over the lower edge of the slide pusher S.

At the underside of the plate 35, in about its center, a transporting lever 27 is supported, which can swivel about an axis 47 that is parallel to the longitudinal direction of the housing and which, in the resting position of the transporting lever 27, has a working surface 48 protruding into the path of the slide pusher S or arranged in the guiding mechanism 45 and a driving surface 29 for the slide, which is arranged above the path of the slide pusher S. Preferably, the transporting lever 27 is a sheet metal part with bent tabs, at which the working surface 48 and the driving surface 29 are formed. These two surfaces 48 and 29 are curved convexly to the slide pusher S or to the slide. In addition, the driving surfaces 29 encloses an angle of less than 90° with the plane of the transporting lever 27, in order to lay hold of the slide securely. In its resting position, the transporting lever 27 is pretensioned with the help of the spring 49, which is wound about the axis 47 and lodged, on the one hand, against a tab 50 of the transporting lever 27 and, on the other, against an abutment 51 on the plate 35; the resting position of the transporting lever 27 is determined by a stop 52 on the plate 35. At its free end, the transporting lever 27 has a nose 53, which engages the guiding slot 54 in the plate 35.

In order to hold the slide perpendicular to the base 2, a stop 55 for the respective foremost slide in the compartment 8 is formed on the plate 35. This stop 55 is as wide as the underside of the plate 35 and, over an inclined surface 56, goes over into a recessed region 57 (FIG. 6A).

In FIG. 6, the initial position of the slide pusher S with solid lines. The slide pusher S is pushed forwards from this position in the direction of the arrow, until its front face comes up against the working surface 48 of the transporting lever 27 and takes this along. At the same time, the driving surface 29 takes hold of the slide and pushes it out of the housing 1. It is indicated with dotted lines that, at a particular time, the slide pusher S transfers the working surface 48 of the transporting lever 27 and, itself, pushes the slide 10 further forwards; the final positions of the slide pusher S and of the slide 10 are indicated by dot-dash lines.

On block 14 in compartment 9, on the side facing the plate 35, an inclined guiding rib 58 is provided for the returned slides. Moreover, both blocks 13 and 14 of the counterpressure devices have two sliding skids 59 at their underside, which make it possible to shift the blocks 13, 14 with little friction. The two blocks 13, 14 are held against the plate 35 by means of a common spring 60.

The mode of functioning of the slide magazine is explained below by means of FIGS. 7 to 10; these Figures are shown in a simplified fashion and are provided with only the essential reference symbols.

After the block 13 is pulled away from the deflector 7 against the force of the spring 60, the slides that are to be projected, of which the foremost or first is labeled 10, are inserted as a stack, with one lying behind the other and irrespective of their different thicknesses, into the compartment 8 on the input side. Afterwards, the slide magazine is inserted into the projector, the slide pusher S of which is pulled out of the equipment. With the help of stops, which are not shown, the slide magazine is inserted in such a manner, that the opening 20 comes to lie opposite the slide channel of the equipment.

This state is shown in FIG. 7. The block 13 of the counterpressure device pushes the slide stack and, consequently, the foremost slide 10 against the plate 35 of the deflector 7, the slide 10 lying against the stop 55 at the top and against the elastic tab 44 in the region of the opening 20. Since the plate 35 is coupled tiltably at housing 1, it easily assumes a position slightly inclined to the transverse direction of the housing 1, as can be seen from FIG. 7. Moreover, the driving surface 29 of transporting lever 27 back-grasps the rear edge adjacent to the slide pusher S.

If now the slide pusher S is pushed in, its front end enters through the slot 46 in the sidewall 5 into the guiding mechanism 45 of the plate 35 and comes up against the stop at the working surface 48 of the transporting lever. Pushing the slide pusher S in further causes the transporting lever to be carried along or tilted about its axis 47 (TRANSLATOR'S NOTE: The German text here reads "und seine Achse" (and its axis), which surely must be a typographical error, the correct version being "um seine Achse" (about its axis)) and against the force of the spring 49. At the same time, the driving surface 29 of the transporting lever 27 lays hold of the slide 10 at the rear edge and pushes it in the direction of the opening 20. At the front edge, the slide 10 is pushed forwards by the inclined step 43, the elastic tab 44 yielding correspondingly (FIG. 8). At about the same time, the rear end of the slide 10 glides from the stop 55 over the inclined surface 56 on the region 57 and moreover the plate 35 is set upright by the slide pusher, which is pushed forward in the guiding mechanism 45. In this manner, the slide 10 has carried out a short motion in the longitudinal direction of the housing 1 and now stands aligned before the slide channel of the projector.

The following slides in compartment 8 are pressed by block 13 against the plate 35 and support this process.

The slide pusher S is advanced further, until it assumes the position drawn with broken lines in FIG. 6. In this position, the working surface 48 of the transporting lever 27 is out of the path of the slide pusher S. Till now, the transport of the slide 10 has taken place through the agency of the transporting lever 27 and its driving surface 29. From now on, the slide pusher S takes over directly the further advance of the slide 10 into about the position, shown by the dot-and-dash lines. In so doing, the slide pusher S glides over the working surface 48 (see FIGS. 6 and 9).

As soon as the rear end of the slide 10 has reached the region of the opening 20, the tab 44 returns to its starting position or at least so far, that it lies against the stack of slides (FIG. 9).

After the slide is projected, the slide pusher S is pulled out, its front finger S' taking hold of the the slide 10 at the front edge and pushing it out of the slide channel through the opening 20 into the housing. At the same time, the rear edge of the slide 10 comes up against the part 18 of the deflector surface 17, which is formed on the tab 44 and which deflects the slide 10 into the compartment 9. As the slide pusher S continues to be pulled out, the slide 10 is pushed between the deflector 7 and the block 14, the slide 10 gliding along the second part 19 of the deflector surface 17 and the guiding rib 58, until the slide pusher S has been pulled out completely and the slide 10 is in the compartment 9.

During this process, as soon as the front end of the slide pusher S has been moved over the working surface 48, the transporting lever 27 returns to its initial position under the action of the spring 49. As is evident from FIG. 9, the tab of the transporting lever 27, on which the driving surface 29 is formed, is wedge-shaped at the side facing the stack of slides; in this manner, this tab can readily enter between the stack of slides and the plate 35, the slides being raised from the deflector 7 against the action of the counterpressure device and then—as soon as the transporting lever 27 is in the resting position and the driving surface 29 is above the sidewall 5 of the housing 1—being pressed once again against the deflector 7. In addition, tab 44 places plate 35 once again in a slightly inclined position, a counterpressure, however, being exerted on the plate 35 as the number of slides in the compartment 9 on the discharge side increases.

The tab 44 need not necessarily be formed in one piece with the plate 35; it may, for example, consist of spring sheet metal, and be attached to the plate, for example, by wedging or riveting it on the plate. Likewise, the swivel support of the plate 35 may be constructed in a different manner, which is familiar to those skilled in the art.

It is essential that the transport of the slide takes place initially with the help of the transporting lever 27, which is moved by the slide pusher S, and then by means of the slide pusher S itself.

It should be understood that the positions of the individual components and the slides, shown in FIGS. 7 to 10, are schematic. The actual positions arise out of the ability of the plate 35 to swivel and out of the resilience of the tab 44 and the springs 49 and 60, as well as out of the forces of the transporting lever 27, acting on the slides, and the frictional forces.

I claim:

1. Slide magazine with an essentially box-shaped housing, said housing having a base (2) portion and open at the top, for a slide projector with a picture-changing device having a horizontally actuated slide pusher, wherein an opening (20), matching the thickness of a slide (10), is formed in a longitudinal wall (3) of the housing (1) at about the longitudinal center, said magazine comprising a deflector (7), with a deflecting surface (17) that runs essentially at an angle to the longitudinal center plane of the housing (1), lies opposite this opening (20), in the area of the deflector (7) a transporting lever (27), which can be moved transversely to the longitudinal center plane from a resting position to a working position, is provided with a working surface, which works together with the slide pusher (S) of the picture-changing device of the projector and which, when the slide magazine is inserted into the projector and the transporting lever (27) is in the resting position, protrudes into the path of the slide pusher (S) or, when the transporting lever (27) is in the working position, is arranged outside of this path, the transporting lever (27) having a driving surface (29) for a slide (10), which projects beyond the deflector, is arranged at that side of the transporting lever (27) associated with the end of the deflector (7) nearer to the opening (20) and which, when the transporting lever (27) is in the working position, is shifted by a predetermined amount in the direction of the opening (20), and wherein a counterpressure device, which is known as such, is provided for the slides (10) on each side of the deflector (7), said housing provided with a guiding mechanism (26) in which the transporting lever (27) is movably mounted, said slide pusher extending transversely across said guiding mechansim (26), the magazine remaining stationary during the presentation of successive slides.

2. Slide magazine as defined in claim 1, wherein the deflector (7) is bounded at its sides by inclined surfaces (30, 31) converging towards the opening (20) (FIG. 1).

3. Slide magazine as defined in claim 1, wherein the deflector (7) is divided into two parts, each of which has a part (18, 19) of the deflecting surface (17).

4. Slide magazine as defined in claim 3, wherein the parts (18, 19) or the deflecting surface (17) are mutually offset transversely to the longitudinal center plane (FIG. 1).

5. Slide magazine as defined in claim 3, wherein the deflector (7) is divided along a plane, running through the center of the opening (20) as well as vertically to the longitudinal center plane, into two ribs (15, 16), which are arranged one above the other and each of which has a portion (18, 19) of the deflecting surface (17) (FIGS. 1, 2, 3).

6. Slide magazine as defined in claim 1, wherein two oppositely pretensioned restraining organs (21), which are movable at least parallel to the longitudinal center plane, are arranged in the opening (20) (FIGS. 1, 4).

7. Slide magazine as defined in claim 6, wherein each restraining organ (21) is formed by a U-shaped end of a spring wire (22), which is mounted at a distance from the opening (20) (FIG. 4).

8. Slide magazine as defined in claim 7, wherein each spring wire (22) is L-shaped, the one leg, running essentially vertically to the base of the housing, carrying the restraining organ (21) and being supported at a distance from the same in such a way that it can rotate freely and the other leg, arranged above the restraining organ, pointing away from the opening (20) (FIG. 4).

9. Slide magazine as defined in claim 7, wherein each spring wire (22) is mounted on a sheet bar (23), which is connected with the housing (1) (FIG. 4).

10. Slide magazine as defined in claim 1, wherein the transporting lever (27) is L-shaped and supported in the housing (1) so that it can be shifted to a predetermined extent (FIGS. 2, 3).

11. Slide magazine as defined in claim 1, wherein the transporting lever (27) can be swivelled about an axis parallel to the longitudinal axis of the magazine (FIG. 2)

12. Slide magazine as defined in claim 1, wherein transporting lever (27) is pretensioned in the resting position by a spring.

13. Slide magazine as defined in claim 1, wherein the one leg of the transporting lever (27) is guided in the base (2) of the housing and the other leg of the transporting lever (27) has two recesses, matching the ribs (15, 16) (FIG. 3).

14. Slide magazine as defined in claim 2, wherein the driving surface (29) of the transporting lever (27) runs essentially perpendicular to the adjacent inclined surface (30) of the deflector (7) (FIG. 1).

15. Slide magazine as defined in claim 1, wherein the opening (20) is enlarged towards the outside of the housing.

16. Slide magazine as defined in claim 1, wherein each counterpressure device has a block (13, 14), which is pretensioned relative to the deflector (7) and mounted so that it can be moved in the longitudinal direction of the housing and the surfaces of which, pointing to the deflector (7), run parallel to the associated inclined surfaces (30, 31) of the deflector (7) (FIG. 1).

17. Slide magazine as defined in claim 1, wherein the deflector (7) is formed by a plate (35), which preferably is mounted in the housing (1) so that it can be swivelled to a limited degree, the transporting lever (27) being provided on the plate.

18. Slide magazine as defined in claim 17, wherein, so that it can be swivelled when mounted, the plate (35) has plug-in pegs (36), which engage appropriate recesses (37) in the housing (1) with play.

19. Slide magazine as defined in claim 17, wherein the plate (35) tapers towards the opening (20).

20. Slide magazine as defined in claim 17, wherein the part (18) of the deflecting surface (17), lying closer to the opening (20), is formed on a tab (41), especially a tab (41) which is integrally molded in one part with the plate (35) and which is spring-mounted on the plate (35).

21. Slide magazine as defined in claim 17, wherein a guiding mechanism (44) for the slide pusher (S) is provided on the plate (35).

22. Slide magazine as defined in claim 21, wherein the guiding mechanism (44) is enlarged at its end facing away from the opening (20).

23. Slide magazine as defined in claim 17, wherein the transporting lever (27), mounted on the plate (35) so that it can swivel, is guided at its free end in a guiding slot (54) of the plate (35).

24. Slide magazine as defined in claim 17, wherein the transporting lever (27) is wedge-shaped in the region of the driving surface (29).

25. Slide magazine as defined in claim 17, wherein the plate (35), at its side corresponding to the input side of the slides, has a stop (55) for the respective foremost slide, an inclined surface (56) adjoining the stop (55).

26. Slide magazine as defined in claim 17, wherein the driving surface (29) is curved convexly in the direction of the opening (20).

27. Slide magazine as defined in claim 17, wherein the opening (20) is enlarged towards the interior of the housing.

28. Slide magazine as defined in claim 17, wherein the counterpressure device (14), associated with the discharge side of the deflector (7), is provided with an inclined guiding rib (58) or the like.

29. Slide magazine as defined in claim 1, wherein the counterpressure devices (13, 14) rest on the base (2) of the housing (1) on two sliding skids (59).

30. Slide magazine as defined in claim 1, wherein the housing (1) is provided with at least one stop, and especially with an adjustable stop, which is used to set the position of the opening (20) relative to the slide channel of the projector.

* * * * *